(12) United States Patent
Stiller

(10) Patent No.: US 6,778,928 B2
(45) Date of Patent: Aug. 17, 2004

(54) METHOD OF CALIBRATING A SENSOR SYSTEM

(75) Inventor: Christoph Stiller, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 91 days.

(21) Appl. No.: 09/748,492

(22) Filed: Dec. 26, 2000

(65) Prior Publication Data

US 2002/0072869 A1 Jun. 13, 2002

(30) Foreign Application Priority Data

Dec. 24, 1999 (DE) .......................................... 199 62 997

(51) Int. Cl.[7] .............................................. G06F 19/00
(52) U.S. Cl. .................................. 702/104; 364/424.02
(58) Field of Search ....................... 364/424.02, 474.35; 701/301, 300, 1, 200; 367/99; 702/104; 340/435

(56) References Cited

U.S. PATENT DOCUMENTS

| | | | | |
|---|---|---|---|---|
| 5,068,791 A | * | 11/1991 | Klopfleisch et al. ... | 364/424.02 |
| 5,247,487 A | * | 9/1993 | Beliveau et al. .............. | 367/99 |
| 5,949,685 A | * | 9/1999 | Greenwood et al. ... | 364/474.35 |
| 6,047,234 A | * | 4/2000 | Cherveny et al. ............ | 701/200 |
| 6,226,571 B1 | * | 5/2001 | Kai ............................... | 701/1 |
| 6,275,773 B1 | * | 8/2001 | Lemelson et al. ........... | 701/301 |
| 6,292,752 B1 | * | 9/2001 | Franke et al. ................ | 701/300 |

FOREIGN PATENT DOCUMENTS

| DE | 42 42 700 | 6/1994 |
|---|---|---|
| EP | 0 602 013 | 6/1994 |

* cited by examiner

*Primary Examiner*—John Barlow
*Assistant Examiner*—Xiuqin Sun
(74) *Attorney, Agent, or Firm*—Kenyon & Kenyon

(57) ABSTRACT

A method of calibrating a sensor system which is used to detect and analyze objects in the path of a vehicle is described. In this method, characteristic data of the objects is detected with the sensor system, and data interpreted as stationary or quasi-stationary objects, taking into account the vehicle's own motion, is sent to a calibration unit. In the calibration unit, the deviation of the instantaneously measured data from data of a model of the objects is determined as the error vector and used for correcting the data of the model for the purpose of minimizing the deviation.

6 Claims, 2 Drawing Sheets

METHOD OF CALIBRATING A SENSOR SYSTEM

FIELD OF THE INVENTION

The present invention relates to a method of calibrating a sensor system, in particular an image processing system.

BACKGROUND INFORMATION

It is known that image recording or camera systems and other sensor systems are used as a module of a vehicle safety system in road traffic. In this case, information regarding the distance and relative velocity of the vehicle is constantly being processed in relation to other objects, i.e., other vehicles, and the prevailing road conditions. The image recording systems and optionally also radar sensors are used to measure geometric quantities in the vehicle environment; e.g., radar sensors are known from German Published Patent Application No. 42 42 700 A1, for example. With this known arrangement, a cruise control, for example, in a vehicle can be expanded so that driving speed is adapted to slower vehicles in front if the sensor systems detect such vehicles in the anticipated path of the vehicle. For example, the path of the vehicle can be determined with the help of yaw sensors, steering angle sensors or transverse acceleration sensors, on the basis of wheel speeds or also with the above-mentioned image processing systems or navigation systems.

For satisfactory functioning of the system, prior calibration of the sensor system or the individual sensors in the vehicle environment is done in principle for a subsequent accurate measurement of geometric quantities such as lengths, speeds, etc.; this is done in a laboratory-like environment either before or after installation of the sensors in the vehicle. The various calibration methods, usually require controlled movement of the sensors or the objects detected by the sensor systems. Often it is even desirable to observe a specific artificial object, which is then referred to as a calibration field accordingly. To guarantee permanent functional reliability, subsequent repeated checking of the calibration for possible changes is desirable, which may be very complicated.

It is known from European Patent No. 602 013 that ambient information available from a road map, for example, is used to calibrate a compound navigation system. In this case, information regarding the driver's own vehicle status is processed in combination with known information about the environment available from the map.

SUMMARY OF THE INVENTION

A method of calibrating a sensor system which is used to detect and analyze objects in the path of a vehicle is carried out according to the present invention in such a way that characteristic data on the objects,, including the roadway, is detected with the sensor system in an advantageous manner, and data recognized as stationary or quasi-stationary objects, taking into account the movement of the vehicle, is sent to a calibration unit. The deviation in the data measured instantaneously from data provided by a model of the objects is determined as an error vector in this calibration unit and used to correct the data of the model for the purpose of minimizing the deviation, e.g., by an iterative method.

An automatic calibration of a sensor system can be performed in an especially advantageous manner according to the present invention, which also permits subsequent automatic checking of a calibration that has already been performed. To do so, no other equipment is necessary except for the essentially known sensor elements in the vehicle environment and an analyzer unit or calibration unit.

Furthermore, no special movements of the vehicle which previously had to be executed separately for the purpose of calibration are necessary here because the calibration according to the present invention instead utilizes the vehicle's own movement in operation as well as the knowledge that objects in the three-dimensional world are often rigid and that they move as a whole, and the calibration of the sensors is stable over a longer period of time. In this case, the calibration of the sensor system is quasi-permanent, i.e., it is variable but only gradually. Heuristic assumptions regarding the typical behavior of other vehicles (e.g., remaining in their lane) which can result in malfunctions in practical applications are not necessary for this method. Thus, one property of the present invention is that it permits a calibration which detects the measurable quantities as well as possible. The demand for a so-called true calibration, such as that in the case of a laboratory calibration, is only secondary here.

In addition, from the standpoint of manufacturing technology, installation of uncalibrated sensors is especially advantageous, because the calibration of a sensor is often sensitive to mechanical or thermal stress. Thus, not only is manufacturing simplified, but also it is readily possible to later take into account the effects of the installation or any other changes in the sensor system or the vehicle on the calibration. In addition, the calibration can be checked at any time.

According to an especially advantageous embodiment of the method according to the present invention, there is a first determination of object data which is stored as model data in an initialization phase with preselectable parameters. In all subsequent measurements which are performed on a cyclic basis, the respective instantaneous object data is processed in the calibration unit with the previously determined and stored model data to obtain the respective error vector.

During the processing of data in the calibration unit, the recurring object data from previous measurements is selected, deleting object data not found again and including object data newly added. The object data showing a reduction in the respective confidence interval after repeated measurements from different positions of the vehicle is characterized as data belonging to a stationary or quasi-stationary object.

In the case of the method according to the present invention, a corresponding relative velocity of objects can also be determined from successive object data and then used to determine the vehicle's own movement. Object data attributable to an object having this same relative velocity can be characterized as data belonging to a stationary or quasi-stationary object. A rotational motion of the vehicle due to pitching and/or cornering can also be used as the vehicle's own motion in an advantageous manner.

The results of calibration of one sensor of the sensor system can be easily transferred to one or more other sensors on the motor vehicle for calibration of these sensors as well. Thus, with the method according to the present invention, joint calibration of most of the vehicle sensors after installation is possible without requiring any special boundary conditions. In particular, the combination of sensors such as camera, radar, wheel sensor, acceleration sensor is advantageous here, but an application in conjunction with LIDAR sensors or ultrasonic sensors is also possible.

For the case when the sensor(s) of the sensor system yield(s) contradictory measurement data, a signal may be transmitted to an analyzer unit or to the driver of the vehicle, for example.

The present invention can thus be used to advantage to perform a calibration with good results without requiring any special calibration arrangement or a calibration motion sequence. The sensor system or analyzer system may be completely or largely automatically self-calibrating and it also may determine the accuracy and reliability of its own calibration. Parameters that are not or have not yet been calibrated are characterized by an infinite inaccuracy. In particular, the method according to the present invention notices major changes in calibration which are possible due to thermal or mechanical shifts, for example.

The present invention can be used to particular advantage when the sensor system has an image recording system where pixels are detected and analyzed serially by an electronic camera having a nonlinear transformer characteristic in the recording intervals. Many traditional image recording methods perform the camera calibration by the indirect route of fundamental matrices and therefore rely on simultaneous recording of the image elements (cubic image grid) and synchronous sensor data. The method according to the present invention, however, also operates with the individual pixels recorded at any desired point in time and with asynchronous sensor data. Thus, the method according to the present invention permits in particular calibration of high-resolution video cameras having a nonlinear characteristic which usually record their pixels serially.

DETAILED DESCRIPTION

Figure 1:
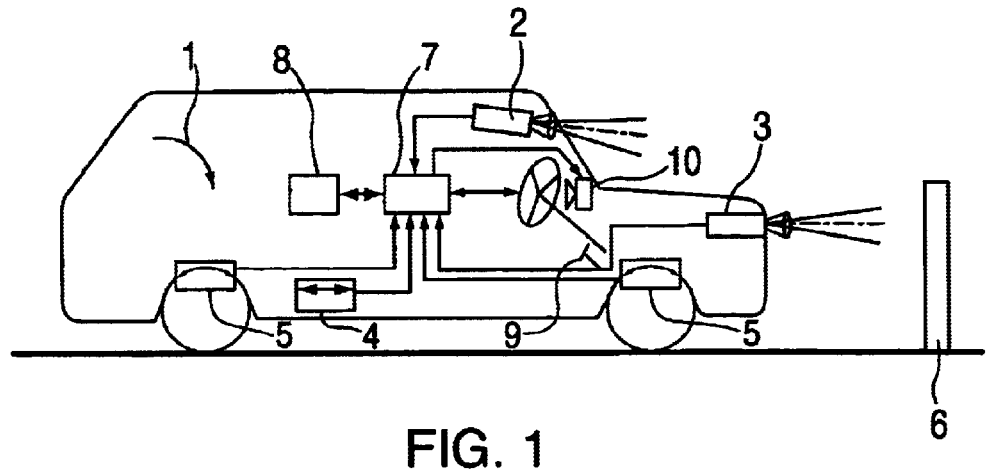
FIG. 1 shows a diagram of a vehicle having a sensor and an analysis and calibration system for use with a plurality of individual sensors including an image recording system.

FIG. 1 shows a possible embodiment of a sensor system for carrying out self-calibration of the sensor elements; this sensor system is integrated into a system for detecting the vehicle environment in a vehicle 1, as mentioned in the introduction to the description. FIG. 1 shows an electronic camera as an image recording sensor 2, a radar sensor 3, an acceleration sensor 4 and additional wheel sensors 5, these sensors being used only as an example. These sensors 2 through 5 may be oriented for detecting the motion of vehicle 1 and the environment in front of the vehicle, as indicated in FIG. 1 with the radiating fields and the arrows for the mechanical quantities to be detected.

In the case of given factors typical of the application, there are objects 6 or even groups of objects 6 in the detection range or in the vehicle environment, which are not deformed over a long period of observation but instead move as a whole. For example, the roadway, crash barriers or under some circumstances even other vehicles may be mentioned in this regard in particular. In the embodiment according to FIG. 1, the data obtained with sensors 2 through 5 is sent to one or more analyzer units 7 which also contain a calibration unit and analyze the information about the vehicle environment and perform the calibration. Analyzer unit 7 is usually present anyway to determine vehicle environment information and it can therefore also be used to determine the calibration parameters.

Analyzer unit 7 requires object data which can be obtained from a memory 8 in order to perform the sensor calibration. With the analysis of the object data, the calibration information in memory 8 is improved in analyzer unit 7 with the analysis of the object data in a manner to be explained below. The information about the vehicle environment as calculated by analyzer unit 7 with the help of the calibration is then converted by an actuator system 9 to influence vehicle 1 and/or is relayed as information to the driver of vehicle 1 over a man-machine interface 10 such as a loudspeaker or a display. Actuator system 9 may process a control signal for the vehicle brakes, for example.

Figure 2:
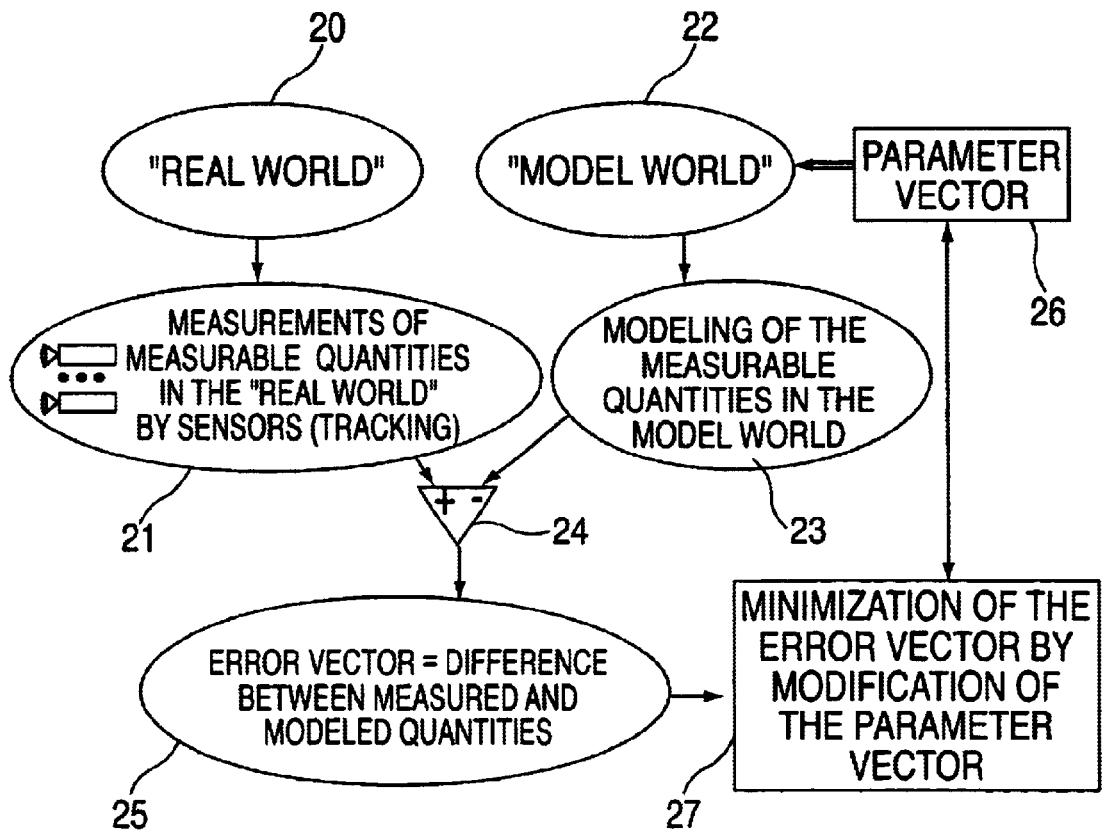
FIG. 2 shows a first flow chart of the calibration steps.

Possible process steps in carrying out the self-calibration of the sensor system in vehicle 1 according to FIG. 1 are illustrated in FIG. 2, where the quantities of a real world, represented by blocks 21 and 22 and measured by sensor elements 2 through 5 are compared with modeled quantities, represented by blocks 22 and 23. The difference between the measured quantities and the modeled quantities is determined in block 24 and forms an error vector in block 25. The calibration is performed within analyzer unit 7 in such a way that the error vector is as small as possible; in other words, the model world corresponds to the real world as closely as possible.

The calibration data obtained from the object data of sensors 2 through 5 together with the model data of the parametric model world, corresponding to the description of the vehicle environment also form a parameter vector which is shown abstractly in a block 26. In addition to the parametric description of the world, the model here also contains the world mapped on quantities that can be measured by sensor elements 2 through 5. For the example of the use of a camera as an image recording sensor 2, this is the projection of the world onto the image sequence. The measurable quantities are then determined from the parametric model world as well as being determined by sensor element 2. The difference between these two determinations of the measurable quantities is grouped to form an error vector (block 25). The parameter vector in block 26 is then adjusted through suitable methods which are characterized in a block 27 so that the error vector is minimal, i.e., it is minimized so that the actual measurements and the quantities determined by the model in conjunction with the instantaneous parameter vector correspond as well as possible.

A simple criterion for a good correspondence of the quantities for carrying out such a minimization method which is essentially known would be, for example, the sum of squares of the deviations. A sufficiently good result can be obtained in the minimization method by way of a so-called least square method, or it is also possible to use other solid calculation methods as well as an extended Kalman filter or a similar approach. All of these methods which are known per se make it possible to determine the accuracy and reliability of parameters and measurements.

The method according to the present invention is based on the assumption, as mentioned above, that rigid objects 6 or groups of such objects 6 exist in the vehicle environment. Therefore, their motion can be described completely by three rotational parameters and three translational parameters. In addition, it is assumed that at least some of these objects 6 are moving relative to vehicle 1, e.g., on the basis of the characteristic motion of vehicle 1. These prerequisites are often satisfied to a sufficient extent so that it is possible to calculate or check the calibration in short intervals.

Figure 3:
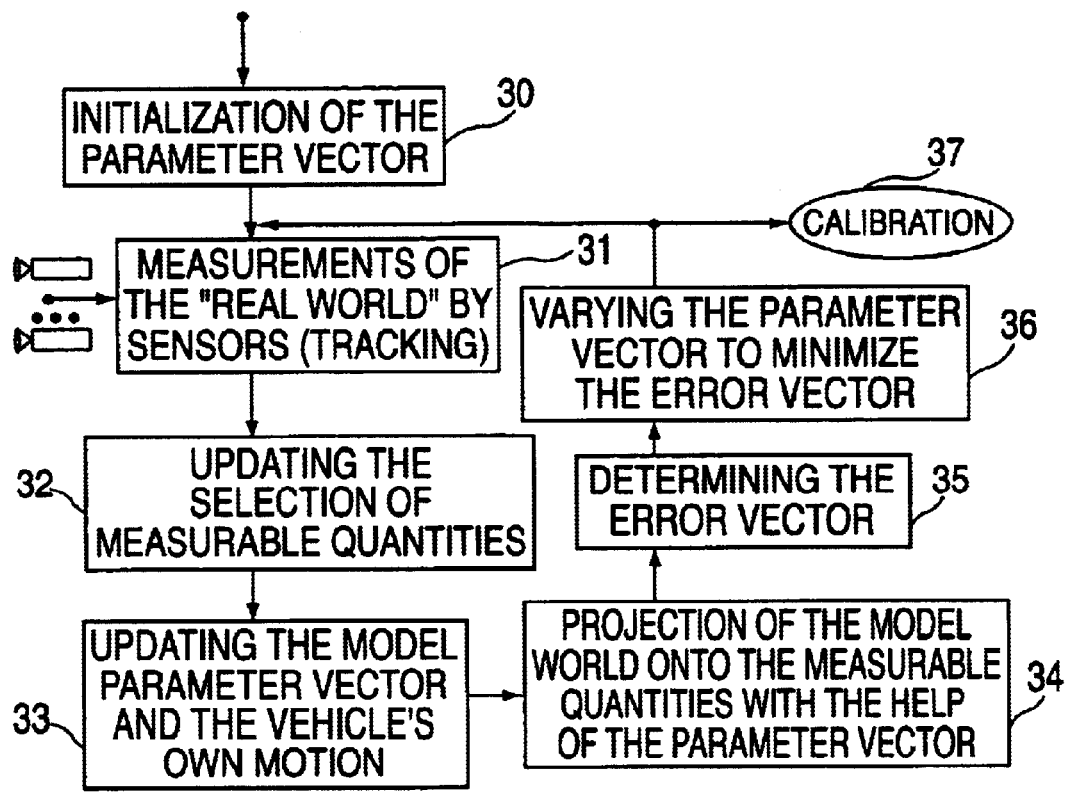
FIG. 3 shows a second flow chart of the calibration steps.
Figure 4:
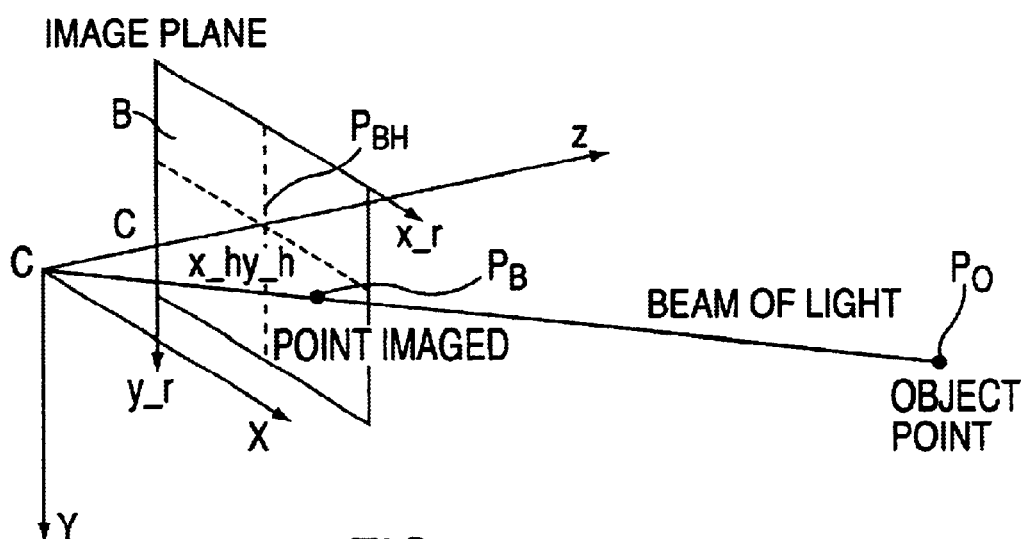
FIG. 4 shows a diagram of a pinhole camera model to illustrate the theoretical relationships in obtaining an error vector in the calibration method.

FIG. 3 shows another possible flow chart for carrying out the method according to the present invention with regard to the analysis of the object data which is explained in conjunction with a so-called pinhole camera model on the basis of FIG. 4. A simple method of analyzing object data is explained below on the basis of the flow chart illustrated in FIG. 3. The basic sensor system includes only one camera (sensor 2) and radar sensor 3. A detailed explanation of the flow chart according to FIG. 3 will be given after a description of FIG. 4.

FIG. 4 shows as an example a simple known mapping model for sensor 2 as a pinhole camera model and is used only for a definition of terms. The calibration parameters of sensors 2 and 3 are combined in a parameter vector together with model quantities of the parametric model world as a description of the vehicle environment as explained with reference to FIG. 2. The model according to FIG. 4 also contains, in addition to the parametric description of the world, the mapping of the world on the quantities that can be measured with sensors 2 and 3. For the example of camera 2 or the pinhole camera according to FIG. 4, this is the projection of the world onto the image sequence. The measurable quantities are then determined from the parametric model world as well as measured by the sensor system. The difference between these two determinations of the measurable quantities is grouped to form an error vector. The parameter vector is adjusted through suitable methods so that the error vector is minimal, i.e., so that the actual measurements and the quantities determined by the model in conjunction with the instantaneous parameter vector correspond as closely as possible. In FIG. 4, point C describes the projection center through which all the imaging rays of sensor 2 pass. The perpendicular to the plane of the image through projection center C is referred to as the optical axis (Z axis). The Z axis intersects an image plane B at main image point $P_{BH}$. Main image point $P_{BH}$ has the coordinates (x_r, y_r) corresponding to (x_h, y_h) in the computer coordinate system spanned by image lines and image columns. The X and Y axes of the camera coordinate system are parallel to the axes of the computer coordinate system. The distance of the projection center from the main image point $P_{BH}$ divided by the distance between two pixels of an image column is referred to as camera constant c. Finally, the ratio of the distance between two pixels within an image column to the distance within one image line is referred to as axis ratio s. For the pinhole camera model according to FIG. 4, the four parameters mentioned here (x_h, y_h, c, s) form the intrinsic parameters of calibration. Thus, the projection of an object point $P_O$ onto the image plane (pixel $P_B$) can be given by the following equation:

$$x\_r = x\_h + s*c*X/Z$$
$$y\_r = y\_h + c*Y/Z \quad (1)$$

It is also assumed here that a simple pinhole camera model according to FIG. 4 is used as the basis for the camera (sensor 2), its intrinsic calibration including the parameters: main image point $P_{BH}$, camera constant c and image axis scaling. In addition, shift vector T and the rotation R between the radar coordinate system and the camera coordinate system should be calibrated for radar sensor 3. This yields the relationship between the camera coordinate system (X, Y, Z) and the radar coordinate system (X_R, Y_R, Z_R) as follows:

$$(X,Y,Z) = R*((X\_R, Y\_R, Z\_R) - T) \quad (2)$$

The calibration parameters of sensors 2 and 3 then form the calibration vector p_k which is sought.

The parameters that can be measured by the camera (sensor 2) include, for example, the image coordinates of stationary characteristic points on objects 6 (corners, etc.), and those that can be measured by radar sensor 3 include the distance, angle and relative velocity of stationary objects 6 in the radar coordinate system. The geometric parameters from which measurable quantities can be determined with the help of the calibration on the basis of the imaging model according to FIG. 4 are referred to here as model parameters p_m. For the selected example, these are the (camera) coordinates of the characteristic points and the coordinates and the relative velocity of objects. The imaging model is given by equation (1) for the camera (sensor 2) and by equation (2) for radar sensor 3. Model parameters p_m together with calibration parameters p_k form the parameter vector p (see block 26 from FIG. 2).

According to the flow chart in FIG. 3, parameter vector p is first initialized (block 30), e.g., the main image point $P_{BH}$ is arbitrarily set at the midpoint of the image, and approximate values such as those given by the camera manufacturer are used as camera constant c and the axis ratio. Shift vector T and rotation vector R are measured approximately, e.g., with a tape measure. Since neither characteristic pixels nor objects have been measured so far, the model parameter vector p_m still does not contain any parameters and the set of measurable quantities is initialized as empty.

In a subsequent step, measurements are performed by sensors 2 and 3 (block 31) with the measurable quantities already determined in previous measurements being sought again in particular in block 32; this is called tracking. The instantaneous set of measurable quantities is then expanded after block 33 by adding new measurable quantities such as new characteristic points that have recently entered the image. The measurable quantities not found again in tracking are then removed from the set of measurable quantities.

For all measurable quantities, the model parameters p_m and the vehicle's own motion at the previous measurement time are determined with the respective confidence intervals by way of known standard methods. After a characteristic object point $P_O$ has been measured the first time, for example, the confidence interval still includes at least one straight line. After repeated measurements of the same characteristic object point $P_O$ from different positions, the model parameters p_m and the vehicle's own motion can be measured with progressively greater accuracy, so that a corresponding confidence interval becomes smaller. Object points $P_O$ with a small confidence interval and coordinates that are stable in time are characterized as belonging to stationary objects 6 and are included in the model parameter vector. Conversely, points that are not stationary or are no longer stationary because of variable coordinates are removed from the model parameter vector. Similarly, the vehicle's own motion is determined by way of solid estimation methods from the relative velocities of all objects 6 as measured by radar sensor 3, and only the objects that move at this relative velocity are accepted as stationary and their position assigned to the model parameter vector.

In contrast with methods using what is know as active observation, thus no special motion of vehicle 1 is necessary for the method according to the present invention as described on the basis of the embodiment, but instead the existing motion of vehicle 1 is determined and utilized. With the help of mapping equations (1) and (2) formulated above, the measurable quantities from the model world are then determined from the parameter vector p according to block 34 from FIG. 3. The difference between the value of the measurable quantities on the basis of the sensor measurement and the modeling is known as the error vector (block 35) with the error vector also depending on the calibration parameters because the modeled values depend on the calibration.

Due to an adjustment calculation as mentioned above, parameter p can be varied according to block 36 so that the error vector becomes smaller, e.g., by a least squares method. Then new measurements by sensors 2 and 3 can be added so that on the whole this yields an iterative calibration method (block 37). In performing the process steps described here, a relatively rapid convergence of the calibration parameters to good values for geometric measurements. The use of rotational motions of vehicle 1 such as those which occur in practice due to pitching or turning a corner is especially favorable for the quality of the calibration.

What is claimed is:

1. A method for calibrating a sensor system for detecting and analyzing an object in a path of a vehicle, comprising the steps of:

detecting characteristic data of the object by operating the sensor system;

sending to a calibration unit data that is interpreted as representing the object as one of stationary and quasi-stationary, taking into account a motion of the vehicle;

determining a deviation in instantaneously measured data from data of a model of the object as an error vector;

correcting, in accordance with the deviation, the data of the model in order to minimize the deviation;

after an initialization phase occurring in accordance with preselectable parameters, performing a first determination of object data stored as model data;

in all subsequent measurements performed cyclically, processing instantaneous data of the object data in the calibration unit with the previously determined and stored model data in order to obtain the respective error vector;

during the processing step, selecting the object data, any object data not found again being deleted and newly added object data being included; and characterizing the object data including a reduction in a respective confidence interval after repeated measurements from different positions of the vehicle as data belonging to one of the stationary object and the quasi-stationary object.

2. The method according to claim 1, further comprising the steps of:

determining a congruent relative velocity of the object from successive ones of the object data;

determining the motion of the vehicle on the basis of the congruent relative velocity; and characterizing the object data attributable to the object including the congruent relative velocity as data belonging to one of the stationary object and the quasi-stationary object.

3. The method according to claim 1, wherein:

a rotational motion of the vehicle due to at least one of a pitching motion and a turning a corner corresponds to the motion of the vehicle.

4. The method according to claim 1, further comprising the step of:

causing a sensor arranged in an image recording system of the sensor system to serially determine and analyze pixels in accordance with an electronic camera having a nonlinear transformer characteristic in a recording interval.

5. The method according claim 1, further comprising the step of:

transferring a result of a calibration of a sensor of the sensor system to at least one other sensor in the vehicle in order to calibrate the at least one other sensor.

6. The method according to claim 1, further comprising the step of:

sending a signal to one of an analyzer unit and a driver of the vehicle when at least one sensor of the sensor system yields contradictory measurement data.

* * * * *

UNITED STATES PATENT AND TRADEMARK OFFICE
CERTIFICATE OF CORRECTION

PATENT NO. : 6,778,928 B2  
DATED : August 17, 2004  
INVENTOR(S) : Christoph Stiller It is certified that error appears in the above-identified patent and that said Letters Patent is hereby corrected as shown below:

<u>Column 1,</u>
Line 20, change "Application No. 42 42 700 A1," to -- Application No. 42 42 700, --
Line 56, change "on the objects,," to -- on the objects, --

<u>Column 4,</u>
Line 19, change "blocks 21 and 22" to -- blocks 20 and 21 --

<u>Column 6,</u>
Line 58, change "what is know" to -- what is known --

Signed and Sealed this

Twelfth Day of July, 2005

JON W. DUDAS
*Director of the United States Patent and Trademark Office*